(No Model.)

T. SANDERS.
LAMP HOLDER FOR BICYCLES.

No. 528,811. Patented Nov. 6, 1894.

Witnesses
John L. Sullivan
Fred A. Crook

Inventor
Thomas Sanders
by Connolly Bro
Attorneys

UNITED STATES PATENT OFFICE.

THOMAS SANDERS, OF BIRMINGHAM, ENGLAND.

LAMP-HOLDER FOR BICYCLES.

SPECIFICATION forming part of Letters Patent No. 528,811, dated November 6, 1894.

Application filed February 10, 1894. Serial No. 499,788. (No model.)

*To all whom it may concern:*

Be it known that I, THOMAS SANDERS, a subject of the Queen of Great Britain, residing at Birmingham, in the county of Warwick, England, have invented certain new and useful Improvements in Lamp-Holders for Bicycles; and I do hereby declare the following to be a full, clear, and exact description of the invention, such as will enable others skilled in the art to which it appertains to make and use the same.

My invention has relation to lamp holders for bicycles and has for its object the provision of a lamp holding device of novel form and construction adapted to support a lamp or lantern in front of the front wheel of a bicycle and close to the ground, so that the range of light from the lantern will brilliantly illuminate the ground in front of the bicycle.

My invention consists in the novel constructions, combinations and arrangements of parts hereinafter described.

Figure 1:
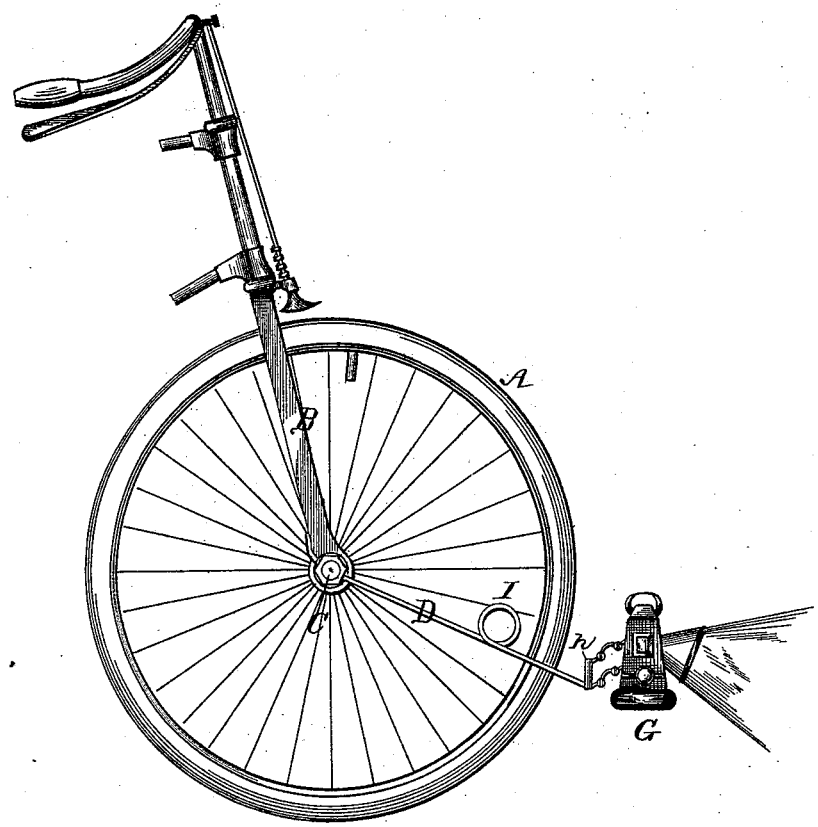
Figure 2:
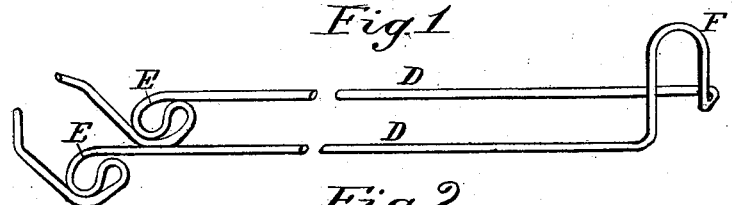
Figure 3:
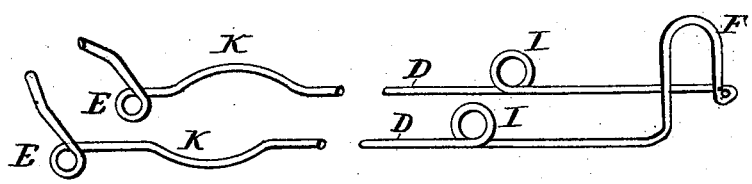

Referring to the accompanying drawings, Figure 1 is a side elevation of the forward parts of a bicycle with my improvement applied thereto. Fig. 2 is a perspective view of my improvement, and Fig. 3 is a perspective view of a modified form of the same.

A, designates the front wheel of a bicycle, B the front fork between the arms of which the wheel A is arranged and C, the axle upon which said wheel turns. The axle C, has a screw thread upon each end and a nut screws upon each end and serves to retain the parts in position, one of these nuts being shown in the side view, Fig. 1.

My improved lamp holder consists of a single piece of wire bent and fashioned to the form shown in the drawings and comprising the arms D, D, adapted to extend from the front of the wheel to the axle and having each an eye E at or near its inner end through which the ends of the axle pass, and the upright loop F, at the forward end for the attachment of the lamp or lantern G. The inner ends of the arms D, D, extend beyond the eyes E, E, and are bent inwardly so as to bear against the back of the fork and assist in maintaining the holder in its proper position.

To attach the holder to the bicycle it is only necessary to remove the nuts from the ends of the axle and slip the eyes E, E, over the axle and then replace the nuts, screwing them down tight upon the eyes.

The lantern shown in Fig. 1, of the drawings and designated G, is attached to the holder by slipping the thimble $h$, over the loop F, and will then be in such position that it will cast the rays of light upon the ground in front of the wheel and strongly illuminate the path at that point where the illumination is essential.

The eyes at the rear ends of the arms D, D, may be formed by bending the metal into a loop and then bending it back on itself as shown in Fig. 2, or the eyes may be formed into complete rings, as shown in Fig. 3.

It is desirable to bend the arms D, D, into rings or loops I, I, about midway between the eyes and the loop F, as shown in Fig. 3, so as to increase the stiffness of, and strengthen the arms, and bends K K may be formed just in front of the eyes, such bends serving as foot rests.

Having described my invention, I claim—

1. A lamp holder for bicycles consisting of a rod or wire bent to form arms adapted to extend from beyond the periphery of the wheel to the axle and having eyes at their inner ends to embrace the axle and a loop at the outer ends for the attachment of a lamp, substantially as described.

2. A lamp holder for bicycles consisting of the arms D, D, the eyes E E adapted to fit over the axle and the inwardly turned ends adapted to bear against the fork, substantially as described.

3. A lamp holder for bicycles consisting of the arms D, D, the loop F at the outer ends of the arms, the eyes E, E near the inner ends of the same, the inwardly turned ends adapted to bear against the fork, the loops I, I, and the bends K, K, forming foot rests, substantially as described.

4. A lamp holder for bicycles consisting of a frame constructed to embrace the front wheel of the bicycle and having its inner ends formed with eyes adapted to receive the axle and having its outer end adapted for attachment to a lamp, substantially as described.

In testimony whereof I have affixed my signature in presence of two witnesses.

THOMAS SANDERS.

Witnesses:
CHAS. H. JOHNSON,
DUNCAN EDWARDS.